Figure 1:
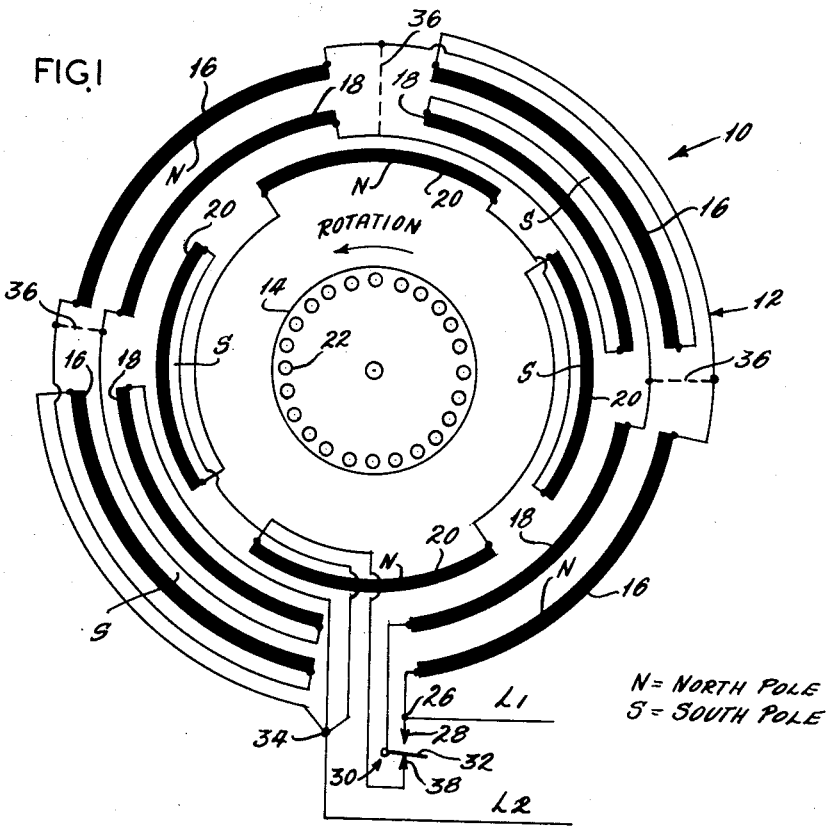

Dec. 11, 1962     C. R. CANTONWINE     3,068,389
ELECTRIC MOTOR CONSTRUCTION

Filed Oct. 3, 1958     2 Sheets-Sheet 1

N = NORTH POLE
S = SOUTH POLE

INVENTOR:
CHARLES R. CANTONWINE
By Gravely, Lieder & Woodruff
ATTORNEYS.

Dec. 11, 1962  C. R. CANTONWINE  3,068,389
ELECTRIC MOTOR CONSTRUCTION
Filed Oct. 3, 1958  2 Sheets-Sheet 2

INVENTOR:
CHARLES R. CANTONWINE
BY Gravely, Lieder & Woodruff
ATTORNEYS

United States Patent Office 3,068,389
Patented Dec. 11, 1962

3,068,389
ELECTRIC MOTOR CONSTRUCTION
Charles R. Cantonwine, Rte. 1, Box 296,
Hot Springs, Ark.
Filed Oct. 3, 1958, Ser. No. 765,238
9 Claims. (Cl. 318—220)

This invention relates to motors in general and more particularly to improved means for starting and running alternating current motors which enables such motors to have reduced starting current without requiring separate impedance devices for starting purposes and without loss of starting torque and furthermore to operate having increased output.

In my co-pending patent application, Serial No. 661,634, filed May 27, 1957, there is described a relatively simple motor construction which uses all of the windings in the motor for starting and for running, thereby increasing the torque and the efficiency.

In the past, it has been the practice to provide alternating current split-phase motors with a high resistance and low inductance starting winding and a running winding of high inductance and low resistance in order to provide means for shifting the phase of the starting current to provide starting torque. Due to the small angle of phase shift that is produced during starting in the known constructions, the total locked rotor current is almost the numeric sum of the current flowing through the main and starting windings. This means that a relatively high starting current is required and this in turn limited the use of split-phase motors to the lower ratings in the fractional horsepower range and forced the use of more costly motor constructions in the larger sizes and also in light and middle starting torque applications. The present invention overcomes these objectionable features of known split-phase motors by providing a relatively simple motor construction having a starting torque that equals or exceeds that provided by known split-phase motors, and this is accomplished with even less starting current.

It is therefore a principal object of this invention to provide an alternating current motor having low starting current without requiring the use of impedance devices and without reducing the capacity and efficiency of the motor.

Another object of the invention is to increase the efficiency of alternating current motors by employing all of the windings thereof during starting and running.

Another object is to employ transformer action between windings of an alternating current motor to produce phase shift and starting torque.

Another object of this invention is to provide an alternating current motor capable of producing an output limited only by the operating conditions of the motor and not by conditions imposed thereon by the starting requirements.

Another object of the invention is to reduce magnetic vibration and noise in alternating current motors especially during starting.

Another object of the invention is to provide an alternating current motor capable of withstanding sustained and frequent starting periods.

Another object is to increase the starting and running efficiencies of alternating current motors.

Another object is to reduce the cost of alternating current motors without reducing the horsepower output thereof.

Another object is to provide an alternating current motor that can be wound and made connectable for dual voltage operation and reversible operation by relatively simple means.

Another object is to provide means for reducing the starting current in alternating current motors which means can be installed as original equipment or added as an improvement on existing motors.

Another object of this invention is to prolong the life and reduce the maintenance costs associated with alternating current motors.

Another object is to provide an alternating current motor in which the starting current need not substantially exceed the current in the main winding of a single phase induction motor.

Still another object is to provide a self-starting alternating current motor that does not require separate impedance or phase shifting devices, shorted or shaded windings, high resistance windings, or commutators and brushes.

This invention covers a motor having a stationary and a rotating winding, one of said windings having first and second adjacent portions and a third phase displaced portion, and speed responsive switch means movable between a starting position in which said first portion is connected to an A.C. source and magnetically coupled to a starting circuit consisting of the second and third portions, and a running position in which said first and second portions are connected to the source.

These and other objects and advantages of the present invention will become apparent after considering this specification in conjunction with the accompanying drawings.

Figure 2:
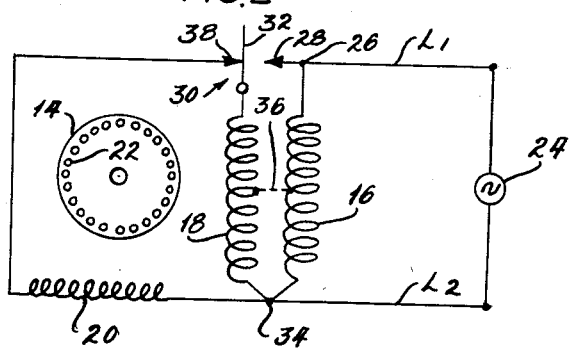
Figure 3:
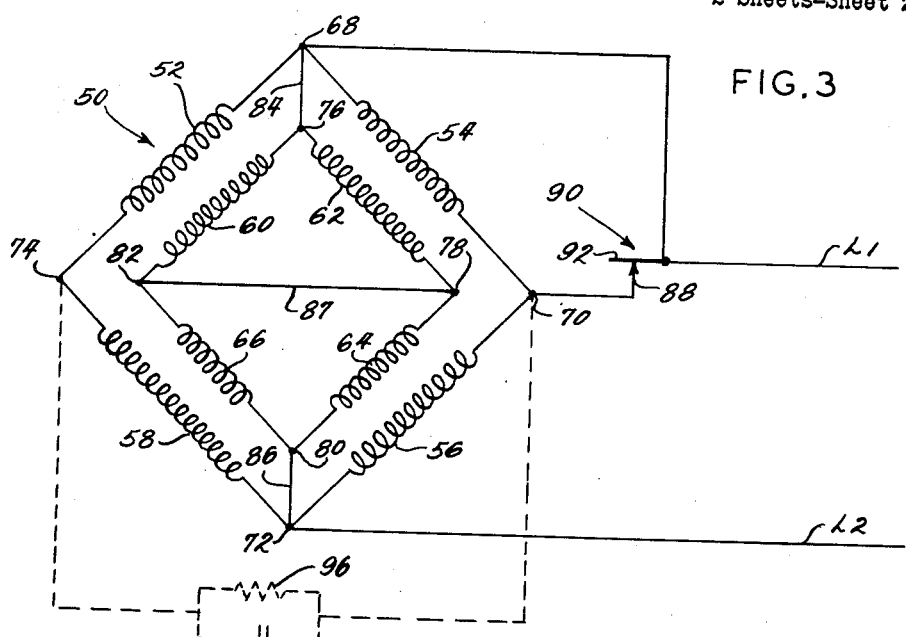
Figure 4:
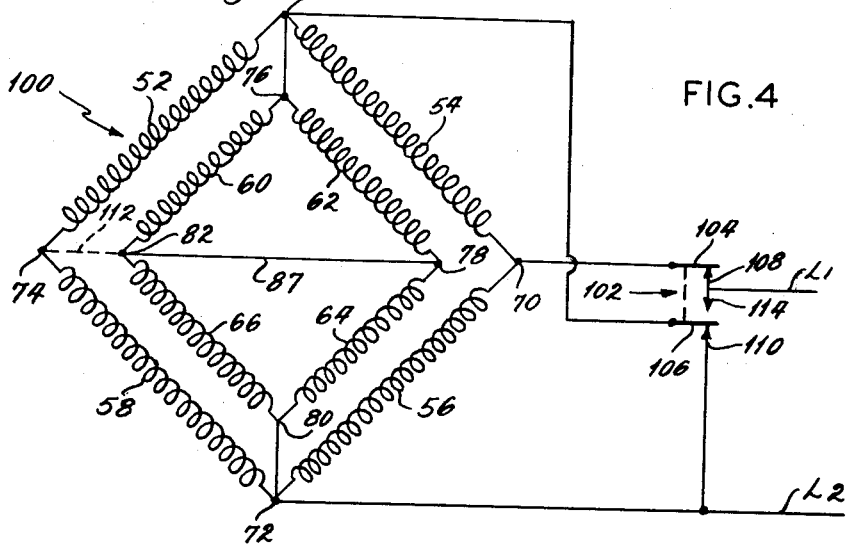

In the drawings:

FIG. 1 is a schematic drawing showing a motor embodying the teachings of the present invention, FIG. 2 is a schematic wiring diagram of the electrical circuit for the motor shown in FIG. 1, FIG. 3 is a schematic wiring diagram showing a modified form of the motor of FIGS. 1 and 2, and including in phantom outline an optional feature which can be added thereto, and FIG. 4 is a schematic wiring diagram showing another modified form of the motor of FIGS. 1 and 2.

Referring to the drawings by reference numbers, the number 10 in FIG. 1 refers to a motor which has a stator 12 and a rotor 14. The stator 12 has three windings mounted thereon. These windings are divided into separate portions and are designated as windings 16, 18 and 20. Although FIG. 1 shows a four-pole motor construction this invention is not intended to be limited to four-pole motor constructions but may be used with motors having any number of poles. Furthermore, although FIG. 1 shows the stator 12 having three separate stator windings 16, 18 and 20 and the rotor 14 having one rotor winding 22, this invention is not intended to be limited to this particular arrangement as either the stator or rotor may be rotatable and the so-called stator windings can be mounted on either the rotating or stationary member depending upon the particular requirements of the motor.

FIG. 2 is a schematic wiring diagram of the motor 10 in FIG. 1 and shows the stator windings connected to an alternating current source 24. The diagram in FIG. 2 is shown in starting condition with power leads L1 and L2 connected across stator winding 16. The lead L1 is connected to one end of the stator winding 16 at terminal 26 and also to a stationary switch contact 28 located on a speed responsive switching device 30. The switch 30 may be a mechanically operated speed responsive switch of a known type or it may be a relay device (not shown) which is responsive to speed changes as reflected by voltage or current changes in any part of the motor circuit. The stator winding 18 is magnetically coupled to the stator winding 16 and acts like a transformer secondary during starting operation. One end of the winding 18 is connected to a movable switch contact 32 on the switching device 30 and the opposite end of the winding 18 is connected to the power lead L2 at terminal 34. The main winding 16 is also connected to the terminal 34. The main winding 16 may optionally be cross connected to stator winding 18 at intermediate points by one or more jumpers 36 as shown in dotted lines in FIGS. 1 and 2. The jumpers 36 are provided to connect portions of the main primary and secondary windings 16 and 18 in parallel. Preferably the jumpers 36 are connected to equipotential points on the windings 16 and 18 under running conditions so that little or no current will flow through the jumpers during running connection. In the starting connection, however, it is expected that current will flow through the jumpers. The purpose of the jumpers is to increase the starting current and starting torque of the motor in about the same ratio by connecting preselected portions of the windings 16 and 18 in parallel. This reduces the effective impedance of these windings as connected across the source and also as connected in the starting circuit. Therefore, by this arrangement more starting current and torque can be obtained than would otherwise be possible. The starting current and starting torque can be further increased by using a relatively low impedance starting winding 20. By changing the location of the connection of the jumper, the starting characteristics can also be changed. It should also be noted that the jumper as shown in FIG. 2 connects the main winding portions 16 and 18 as an equivalent Y connection wherein the parallel connected portions form one leg thereof. For dual voltage connections only one portion of winding 16 is cross connected to winding 18 by jumpers 36 and when jumpers 36 are optionally selected the separate winding portion between the jumper connections and the terminal 34 may be an equivalent single winding.

A normally closed switch contact 38 engages the movable contact 32 during starting operations and is connected to one end of the stator winding 20. The winding 20 has its opposite end connected to the terminal 34. As shown diagrammatically in FIG. 1 the winding 20 is mounted on the stator in an angularly displaced position relative to the windings 16 and 18.

The rotor winding 22, is shown as a closed winding and operates like a squirrel cage winding on a conventional induction motor.

In the starting position, as described, the input voltage is impressed across the winding 16 and winding 16 acts as the primary of a transformer being magnetically coupled to the winding 18 which acts as the transformer secondary. At standstill the inductive coupling between the windings 16 and 22 has a relatively low impedance and causes considerable leakage reactance. The coupling between windings 16 and 18, however, effects a current flow in the starting winding 20 which is at this time connected in series with the winding 18. Since winding 20 is positioned on the stator 12 at a phase angle relative to the windings 16 and 18 (FIG. 1), and since the voltage induced in the winding 18 by winding 16 is approximately 180 degrees out of phase with the voltage across the winding 16, the current flowing in windings 18 and 20 is out of phase with the current flowing in winding 16. Furthermore, a certain amount of leakage reactance due to the inductance of the windings 18 and 20 is also present and causes the current (or flux) produced in the starting winding 20 to lag behind the current (or flux) produced in the main winding 16 by an angle which is even greater than the 180 degrees produced by the transformer action. The effect of this leakage reactance preferably shifts the phase of the secondary current to a position nearer 270 degrees out of phase with the current in the winding 16, and in effect is the same as a 90 degree leading current in the starting winding 20. This is indicated in FIG. 1 by showing that the rotation is from the starting pole toward a like main pole or a counter-clockwise rotor movement. The size of conductor used for the starting winding 20 can be larger in cross-section in the present motor than in conventional motors because the winding 20 does not depend on resistance to split the phase or produce the desired phase shift.

The phase shift thus established produces starting torque which causes the rotor to rotate. As the speed of the motor increases during starting and reaches a predetermined speed, the centrifugal switching device 30 (or electrically operative relay means, not shown) responds and transfers the movable contact 32 to its running position engaging the stationary switch contact 28. The line voltage is now connected across the two windings 16 and 18 which are in parallel and the circuit of the starting winding 20 is open. The stationary contact 28 is not essential to this invention but is included because it is believed more economical to utilize the winding 18 for carrying part of the running load than to have winding 18 idle at running speeds. When winding 18 is used during running operation its physical location in the motor slots and its impedance should be selected so that they improve the performance of the motor at running speeds. In FIG. 1 the relative positions of the windings 16 and 18 are shown in phase for illustrative purposes only and do not necessarily represent the best possible locations therefor.

It is also anticipated to further simplify the present construction by eliminating the switching device 30 altogether and instead, where circumstances permit, connect the phase winding 20 permanently across secondary winding 18 (FIGS. 1 and 2) and connect the primary winding 16 across the line.

In the past split-phase motors have not been constructed for operation on dual voltage connections, that is alternatively on two different source voltages such as on 110 volts and on 220 volts. The present motor 10, however, makes such a connection possible. For dual voltage connection, the winding 16 is wound so that the several portions thereof can be connected in parallel for low voltage operation and in series for high voltage operation. If contact 28 is used and winding 18 is connected in parallel to the winding 16 during running operation, then both portions of the winding 16 should have the same impedance. This provides a more satisfactory condition of operation than the more common practice of providing dual voltage connections for capacitor motors wherein the starting winding and a capacitor are connected across one-half of the main or running winding on the high voltage connection. In the present motor 10 the phase splitting is done solely by induction and transformer action and the characteristics are approximately the same regardless of whether it is connected for high or for low voltage operation.

The present motor construction does not strictly comply with the commonly accepted definition of a split-phase motor because it does not use a high resistance starting winding connected across the power source. Furthermore, the present motor does not fall into the general class of motors using external impedances. Therefore, since the positioning of the windings and the reactive coupling therebetween provides the only means for shifting the phase in the present motor construction, the present motor might possibly be classified as a hybrid type of split-phase motor such as a high impedance split-phase motor or leakage reactance split-phase motor.

It should also be noted that the windings 16, 18 and 20 could be tapped as for example, the starting winding 20 could be tapped to an intermediate point on winding 18, winding 18 could be tapped to an intermediate position on winding 16, winding 16 could be tapped to an intermediate position on winding 18, or the windings 16 and 18 could be cross connected by one or more jumpers such as the jumpers 36 shown in dotted lines in FIGS. 1 and 2. Any one or more of these combinations could be used without changing the basic principle of operation.

Furthermore, it is not always necessary to disconnect the starting winding 20 from the winding 18 when the motor reaches a predetermined speed as noted hereinabove.

In FIG. 3 is shown a modified motor construction 50 which involves somewhat the same principle as the motor 10 except that the stator windings are arranged to start with a plurality of magnetic poles and run with a greater number of poles. For example, it can start as a two-pole motor and run as a four-pole motor which has the unique advantage of utilizing all of the windings (conductors) during the running cycle. The modified motor 50 has two sets of four stator (or rotor) windings, each set being connected in a closed loop. The rotor is not shown. One set of windings is shown in the drawing outside of the other set for convenience of illustration and does not necessarily indicate their physical location on the motor. The windings in the outer set are identified as numbers 52, 54, 56 and 58; and the associated windings in the inner set are identified by numbers 60, 62, 64 and 66. The four outer windings are connected with terminals between each pair of windings as follows: terminal 68 between windings 52 and 54, terminal 70 between windings 54 and 56, terminal 72 between windings 56 and 58, and terminal 74 between windings 58 and 52. The inner set of windings are similarly connected with terminal 76 between windings 60 and 62, terminal 78 between windings 62 and 64, terminal 80 between windings 64 and 66, and terminal 82 between windings 66 and 60.

The windings 54 and 62 are inductively coupled as are the windings 56 and 64, the windings 58 and 66, and the windings 52 and 60. Each pair of inductively coupled windings such as the windings 54 and 62 are mounted at a different location on the motor. For example, the windings 54 and 62 are mounted on the motor opposite from the windings 56 and 64 and each set of said coupled windings may extend substantially half way around the motor. Likewise the windings 58 and 66 are mounted opposite from windings 52 and 60 and are located on the motor at an angle of approximately 90° relative to the windings 54, 62, 56 and 64. With this location for the windings and with the switch 90 closed for starting, the motor has two magnetic poles.

The terminal 68 in the outer set is connected to the terminal 76 in the inner set by a jumper 84, and similarly the terminal 72 in the outer set is connected to the terminal 80 by a jumper 86. Also a jumper 87 is connected between terminals 78 and 82.

The terminal 68 is also connected to line lead L1 and the terminal 72 is connected to the other line lead L2. The terminal 70 on the outer loop is connected to a normally closed stationary switch contact 88 on a speed responsive switch 90, and a transfer contact 92 engages the contact 88 during starting and is connected to the line lead L1.

If motor 50 is a two-pole start and a four-pole run motor, then windings 54 and 62 constitute one of the main poles, windings 56 and 64 constitutes the other main pole, windings 52 and 60 constitute one of the phase displaced starting windings, and windings 58 and 66 constitutes the other phase displaced starting winding.

The switch 90 is closed during starting and opens when the motor speed reaches or exceeds a predetermined value. During starting with the switch 90 closed, the line leads L1 and L2 are connected across opposite terminals of the inner and outer loop at terminals 68 and 72 and lead L1 is also connected to terminal 70 thereby shorting winding 54. The shorting of the winding 54 unbalances the connection of the winding, and the unbalanced condition produces a phase displaced current in certain of the windings relative to other of the windings which produces the torque necessary to start the motor as will be shown.

The unbalanced condition which is present only during starting produces a transformer action between the winding 56 which is connected across the line and the winding 64. Since the winding 56 is connected directly across the line it acts as the primary of a transformer and also as the main motor winding and induces a current in the winding 64 which is 180 degrees out of phase with the current in the winding 56. This induced current together with the leakage reactance and/or inductance of the windings in the inner set produces a phase shift between the current flowing in the winding 64 and also in the windings 60, 62 and 66. This phase shift produces the starting torque. As the speed of the motor 50 increases and reaches and exceeds a predetermined value, the switch 90 opens disconnecting the line lead L1 from the terminal 70. The terminals 68 and 72 only are connected across the line and the windings in both sets are in balance. In this position all of the windings are effective for producing the required number of running poles for the motor and the motor is in balanced condition. The particular motor construction shown in FIG. 3 employs very little starting current and also very little starting torque but has maximum possible output and efficiency at running condition.

It should be noted that the modified motor 50 does not require any separate phase shifting means such as capacitors, reactors or resistors to produce the starting torque. Instead it relies only on the windings themselves and on the action of the switch 90. Furthermore, there is no interruption in the line current once the motor is started due to a change over from starting to running condition because terminals 68 and 72 are always connected across the line.

If it is desired to increase the starting torque of the motor 50, this can be simply accomplished by connecting additional phase shifting circuits across the terminals 70 and 74. Such a circuit is shown in phantom outline in FIG. 3 and consists of a capacitor 94 in parallel with a resistor 96. If such a circuit were used, it would effect the amount of phase shift and starting torque produced during starting operation but would have no effect at running speeds as there would be little or no voltage between terminals 70 and 74 because of the balanced connection of the windings.

In FIG. 4 is shown another form 100 of the motor 10. The motor windings of motor 100 are connected similarly to the windings in motor 50 and are identified by the same numbers. A different form of speed responsive switch is employed and is identified by number 102. However, the switch 102 is connected to the motor windings in a different way than the switches already described. The switch 102 has two ganged transfer contacts 104 and 106, and the transfer contact 104 is connected to motor terminal 70, and the transfer contact 106 is connected to the motor terminal 68.

During starting the transfer contacts 104 and 106 are respectively engaged with stationary switch contacts 108 and 110 and in this position the motor terminal 70 is connected to line lead L1 through switch contacts 104 and 108, motor terminal 68 is connected to line lead L2 through switch contacts 106 and 110, and the motor terminal 72 is connected directly to line lead L2. Obviously, therefore terminals 68 and 72 are common during starting.

In the starting condition, as described, windings 54 and 56 constitute the main windings of a two-pole motor and by transformer action induce currents 180 degrees out of phase in windings 62 and 64 respectively. These induced currents are transferred to the starting windings (52 and 60) and (58 and 66) which are positioned on the motor at a spaced angle relative to the main windings and are connected across the secondary windings 62 and 64 respectively. (Note: In the modified structure 100 a jumper 87 is connected between terminals 82 and 78 and a jumper 112, shown in dotted line, is optionally connected between motor terminals 74 and 82, and these jumpers connect windings 52 and 60 in parallel and also connects windings 58 and 66 in parallel. The jumper 112 can be eliminated, if desired, but if used the windings 52 and 60 can be replaced by a single equivalent winding and the windings 58 and 66 can also be replaced by a single equivalent winding.)

A phase shift is established in motor 100 between the current (or flux) in the main windings 54 and 56 and the current (or flux) in the associated starting circuits (one consisting of windings 62, 60 and 52, and the other of windings 64, 66 and 58). This phase shift is sufficient in combination with the reactance of the windings to provide the desired starting torque. The direction of the phase shift is the same as in a capacitor or resistor split-phase motor, that is, the current in the starting circuits leads the current in the main windings. This is explained by the fact that the currents through the secondary winding 62 and 64 are 180 degrees out of phase with the currents in the respective primary or main windings 54 and 56, and the reactance of of the secondary windings 62 and 64 added to the reactance of the starting windings produces the desired phase shift for starting.

When the motor 100 reaches running speeds, the switch contacts 104 and 106 transfer moving out of engagement with contacts 108 and 110. In so doing, the contact 106 engages a running contact 114 and connects the line lead L1 to the motor terminal 68 thereby connecting the terminals 68 and 72 across the line and connecting the motor in a four-pole balanced condition. In the running connection all of the windings contribute to carrying a share of the running current. In running condition, the transfer terminal 104 is inoperative.

In regard to the modified motors shown in FIGS. 3 and 4 it should be noted that for maximum running output the ratio of the turns in winding 56 to the turns in winding 54 should be the same as the ratio of the turns in winding 62 to the turns in winding 64, and furthermore the total combined turns in windings 56 and 54 should equal the total combined turns in windings 62 and 64. This assumes that the conductor size used is the same for all windings. Likewise, the ratio of the turns in winding 66 to the turns in winding 60 should equal the ratio of turns in winding 52 to the turns in winding 58, and the total combined turns in windings 66 and 60 should equal the total combined turns in windings 58 and 52. This again assumes that all of the windings are constructed of the same size wire.

Thus, it is apparent that there has been described a novel motor construction which makes use only of the inductive and reactive characteristics of the windings themselves to produce the desired starting torque and which operates in a highly efficient and balanced condition during running operation, and which fulfills all of the objects and advantages sought therefor. It is to be understood that the foregoing description and the accompanying drawings have been presented only by way of illustration and example, and that changes, modifications and alterations in the present disclosure, which will be readily apparent to one skilled in the art, are contemplated as being within the scope of the present invention which is limited only by the claims which follow.

What is claimed is:

1. An alternating current device comprising a stationary member having a winding thereon and a rotatable member having a winding thereon, one of said windings having a main portion, a secondary portion positioned adjacent to the main portion and magnetically coupled thereto, part of each of said main and secondary portions being permanently connected in parallel, a starting portion angularly displaced relative to the main and secondary portions on the associated member, an A.C. source, and switch means movable between a start position in which the A.C. source is connected across the main portion and the secondary portion is connected in a closed circuit with the starting portion, and a running position in which the main, secondary and starting portions are connected in parallel across the A.C. source.

2. A multi-voltage, adjustable torque leakage reactance split phase alternating current motor comprising a stator having a stator winding thereon and a rotor having a rotor winding thereon, one of said windings having a main winding portion and at least one starting winding portion, said starting winding portion being physically located on the motor at an angle relative to the said main winding portion and having an impedance that is relatively low compared to the impedance of the main winding portion, said main winding portion having inductively coupled primary and secondary winding sections, means connecting at least one end and one intermediate location on said primary and secondary sections together to form a parallel connected portion of said sections, speed responsive switch means movable between a starting position when the motor is operating below a predetermined speed and a running position when the motor speed exceeds said predetermined speed, means connecting the primary winding section across an alternating current source, other means connecting a portion of said secondary section including the parallel connected portion thereof in a closed circuit with said starting winding portion, said switch means in running position thereof connecting all of said secondary section in parallel with all of said primary section across the alternating current source, the inductive coupling between the primary and secondary winding sections and the inductance of said windings contributing to produce a current in the starting winding that is out of phase with the current in the primary section during starting.

3. An adjustable torque leakage reactance split phase alternating current motor comprising a stator having a stator winding thereon and a rotor having a rotor winding thereon, one of said windings having a main portion and at least one starting winding portion, said starting winding portion being angularly positioned on the motor relative to the said main portion, said main portion including mutually inductively coupled primary and secondary winding sections, means connecting together at least one end and one intermediate location on each of said inductively coupled sections to form a parallel connected portion of said sections, speed responsive switch means on the motor movable between a starting position and a running position in response to preselected changes in the motor speed, means connecting a portion of said primary section including the parallel connected portion thereof across a source of alternating current, means including the switch means in the starting position thereof connecting said secondary section including said parallel connected portion thereof in a closed circuit with said starting winding portion, said switch means operating to open the closed circuit in the running position thereof, the leakage reactance between said primary and said secondary sections and the inductance of the windings producing current in the starting winding portion that is of different phase than the current in the primary winding section.

4. A multi-voltage, adjustable torque leakage reactance split phase alternating current motor comprising a stator having a stator winding thereon and a rotor having a rotor winding thereon, one of said windings having angularly related main and starting winding portions, said starting winding portion having a relatively low impedance compared to the impedance of the main winding portions, a first part of the said main portion including mutually inductively coupled primary and secondary sections, and means connecting together at least one end and one intermediate location on each of said coupled winding sections, said coupled sections forming at least one pole winding group, speed responsive switch means in the motor movable between a starting position and a running position in response to preselected changes in the motor speed, means including the starting position of the switch means connecting the secondary section of the main winding portion in a closed circuit with the starting winding portion, said switch means in the running position thereof opening the closed circuit to the starting winding portion, the current in said starting winding portion being out of phase with the current in the said primary section of the main portion, said out of phase current being produced by the leakage reactance between the primary and secondary sections and by the inductances of the windings.

5. A multi-voltage, leakage reactance split phase alternating current motor comprising a stator having a stator winding thereon and a rotor having a rotor winding thereon, one of said windings having relatively angularly related main and starting winding portions, said main winding portion having first and second mutually inductively coupled winding sections forming part of one pole winding group, and a third section of said main winding portion connected in series with the coupled first and second sections to form a Y connection therewith, the phase relation of the current flowing in each of the said first, second, and third sections being different, means including speed responsive switch means connecting said starting winding portion in series circuit with the second section and at least part of the said third section during starting of the motor, other means connecting said first and third sections in series across an alternating current source, the current in the starting winding portion being out of phase relative to the current in the first and third sections, said out of phase condition being in part produced by the mutual inductance between the first and second sections, in part by the leakage reactances of the first, second and third sections, and in part the inductances of the windings.

6. A leakage reactance, split phase, alternating current motor comprising a stator having a stator winding thereon and a rotor having a rotor winding thereon, one of said windings have relatively angularly positioned main and starting winding portions, said main portion having first and second mutually inductively coupled winding sections forming part of one pole winding group, and a third section at least a part of which is connected to the first and second sections forming a Y connection therewith, the phase relation of current flowing in each of said first, second and third sections being different, speed responsive switch means on the motor movable between a starting position and a running position in response to changes of motor speed, means connecting said first and third winding sections in series across a source of alternating current, other means connecting said starting winding portion in a closed circuit with said second and third winding sections during starting, said switch means in the runnng position thereof connecting said first and second winding sections in parallel and the parallel combination thereof in series with the third winding section across the source of alternating current, the current in the starting winding portion being out of phase relative to the current in the first and third sections during starting, said out of phase current condition being in part produced by the mutual inductance between the first and second sections, in part by the leakage reactances of the first, second and third sections, and in part by the inductances of said winding sections.

7. A leakage reactance, split phase, alternating current motor comprising a stator having a winding thereon and a rotor having a winding thereon, one of said windings having relatively angularly positioned main and starting winding portions, said main portion having first and second mutually inductively coupled winding sections forming part of one pole winding group, and a third section at least a part of which is connected to the first and second sections forming a Y connection therewith, the phase relation of current flowing in each of said first, second and third sections being different due to the leakage reactances between said winding sections, and speed responsive switch means movable between a starting position when the motor is operating at less than a preselected speed and a running position when the motor speed exceeds said preselected speed, means connecting said first section in series with said third section across the source of alternating current, and other means including the starting position of the switch means for connecting said starting winding portion in a closed circuit with said second and said third winding sections to load said sections during starting and thereby substantially increase the aforesaid leakage reactances, the current in said starting winding portion being out of phase relative to the current in the first and third sections, said out of phase current condition being in part produced by the mutual inductance between the first and second sections, in part by the leakage reactances of the first, second and third sections, and in part by the inductances of said winding sections.

8. The motor defined in claim 7 wherein said switch means includes means for connecting said first and said second sections in parallel at running speeds.

9. A multi-voltage, adjustable torque leakage reactance split phase alternating current motor comprising a stator having a winding thereon and a rotor having a winding thereon, one of said windings having a main portion and at least one starting winding portion, said starting winding portions being angularly positioned relative to said main portion, said main portion having mutually inductively coupled primary and secondary winding sections, means connecting together one end and one intermediate location on said primary and secondary sections, speed responsive switch means movable between a starting position when the speed of the motor is below a preselected speed and a running position when the motor speed is greater than the preselected speed, means connecting said primary section across a source of electric energy, other means including the starting position of the switch means connecting said secondary section in a closed series circuit with said starting winding portion, the running position of said switch means disconnecting the circuit to the starting winding portion and connecting said secondary section in parallel with the primary section across the energy source, the current in said starting winding portion during starting being out of phase with the current in the primary section in part because of the leakage reactance between the primary and the secondary sections and in part because of the inductances of the windings.

References Cited in the file of this patent

UNITED STATES PATENTS

| | | |
|---|---|---|
| 1,894,124 | Schaefer | Jan. 10, 1933 |
| 2,262,870 | Veinott | Nov. 18, 1941 |
| 2,697,809 | Hutchins et al. | Dec. 21, 1954 |
| 2,864,986 | Hutchins et al. | Dec. 16, 1958 |